July 1, 1941.  A. L. THURSTON ET AL  2,247,531
CALCULATOR
Filed Aug. 29, 1939   3 Sheets-Sheet 1

INVENTORS.
ARTHUR L. THURSTON AND
BEAUREGARD SWEENEY
BY
ATTORNEY.

July 1, 1941.    A. L. THURSTON ET AL    2,247,531
CALCULATOR
Filed Aug. 29, 1939    3 Sheets-Sheet 2

INVENTORS
ARTHUR L. THURSTON AND
BEAUREGARD SWEENEY
BY
ATTORNEY.

Patented July 1, 1941

2,247,531

UNITED STATES PATENT OFFICE 2,247,531

CALCULATOR

Arthur L. Thurston, Wantagh, and Beauregard Sweeney, Great Neck, N. Y.

Application August 29, 1939, Serial No. 292,380

23 Claims. (Cl. 235—61)

This invention relates to a calculating device for use in controlling the operation of powered craft, with particular applicability to aircraft.

The performance of an airplane is dependent upon a number of variables. In order for the operator to be able to carry out any flight in the most efficient manner it is essential that he determine the effect of these variables. He can then adjust those variables over which he has control, in such a manner as to accomplish the flight in accordance with the requirements and in the most efficient way consistent with the variables over which he has no control.

The variables which determine the air speed of an airplane in level flight are:
1. The weight of the airplane.
2. The density of the air.
3. The thrust horsepower delivered by the propeller.

The density of the air is in turn a function of the atmospheric pressure and temperature.

The thrust horsepower is a function of the engine brake horsepower and the propeller efficiency.

The variables which determine the brake horsepower of the engine are the revolutions per minute and the brake mean effective pressure developed. The latter is, in turn, determined by
  (a) The atmospheric pressure
  (b) The temperature of the air entering the carburetor, and
  (c) The pressure in the intake manifold.

The determination of propeller efficiency is of such a complex character that it is expedient to eliminate it as a separate variable and instead, to make allowance for its effect by establishing the relation between speed and brake horsepower.

While the above mentioned variables will determine the airspeed, the operator of the airplane is generally interested primarily in his travel with respect to the earth, not the air. This is particularly true in scheduled air transport flight, in which a consideration of the motion of the air relative to the ground—the wind velocity and direction—is essential to efficient operation.

In the past, the operator has been obliged to refer to a series of charts to obtain the information necessary for planning and carrying out a given flight. Calculators have also been devised for carrying out certain of the steps in the computations, but the data obtained from them must then be used with the charts in order to arrive at a final solution of the problem.

It is the object of this invention to provide in one instrument a means by which the operator can quickly and readily determine (1) the result of any combination of the variables upon which the performance of the airplane depends, and (2) the effect of changing each of these variables.

In the calculators previously used, such, for example, as those used for determining the brake horsepower output of the engine, it has been the practice to arrange the instrument in such a way that the resulting data represents the average for the model or type, but may be incorrect for the individual airplane or engine which will vary appreciably from the average.

It is a further object of this invention to provide a calculator with a compensating adjustment which can be set and clamped so that the calculator can be adjusted to give correct results for any individual airplane or engine or both.

A further feature of the invention is that its operation is simple and easy. All the independent variables on the calculator correspond to the readings of various instruments on the airplane. The various curves and indices are arranged to give good intersections and positive readings.

Although the novel features which are believed to be characteristic of this invention will be particularly pointed out in the claims appended hereto, the invention itself, as to its objects and advantages, and the manner in which it may be carried out, may be better understood by referring to the following description of selected embodiments of the invention taken in connection with the accompanying drawings forming a part thereof, in which:

Figure 1:
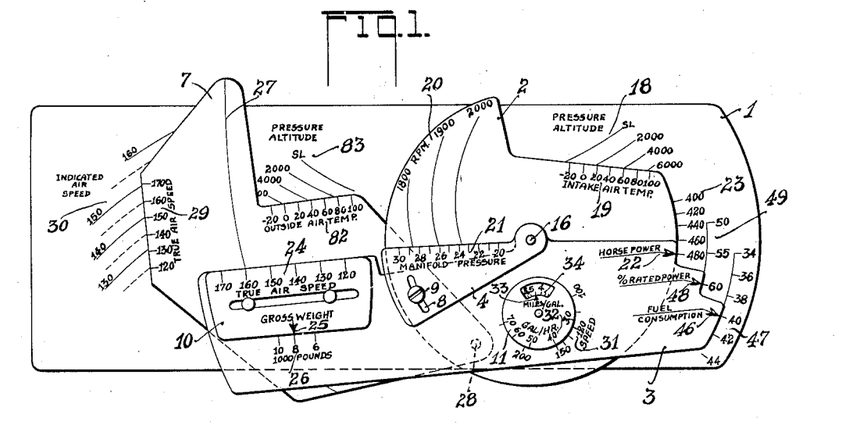
Fig. 1 is a plan view of one side of a calculator showing the mechanism for determining airspeed and the relation between airplane and engine variables and the means for determining flight efficiency.
Figure 2:
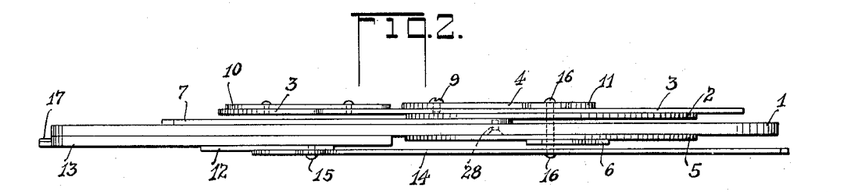
Fig. 2 is a side view of the instrument.
Figure 3:
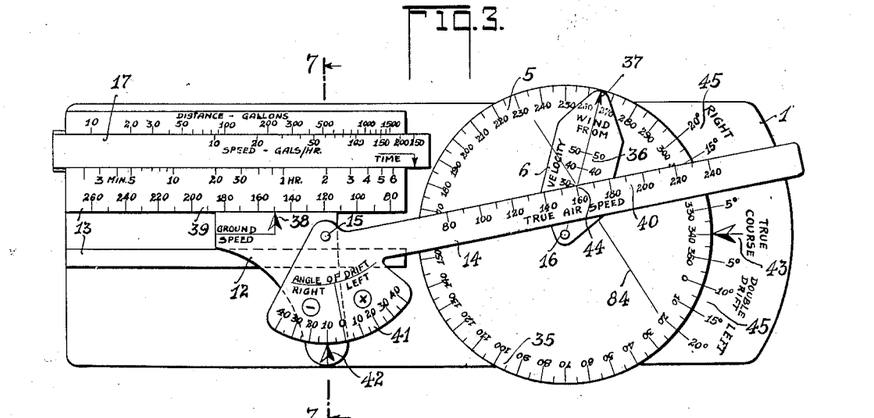
Fig. 3 is a plan view of the reverse side of the instrument showing the mechanism for determining the effect of wind on the travel of the aircraft with respect to the ground.

Referring particularly to Figs. 1, 2, and 3, the calculator combines broadly a support or frame member 1, having mounted thereon on one side, and pivotally connected thereto, a rotatable disc 2, an arm 3 and an arm 4, all pivotally connected to the frame member 1 at the same point 16, and on the reverse side a dial 5 and a transparent arm 6 both pivotally connected to the frame member 1 at the same point 16 as the disc 2. On the front side, as shown in Fig. 1, in addition to the pivoted arms 3 and 4, there is also another movable member 7 which is pivotally connected to the frame 1 at the point 28 independently of the rotatable disc 2 and pivoted arms 3 and 4. Rotatable arm 4 has a slot 8 through which a suitable locking device such as the screw 9, may be inserted, so that the arm 4 may be angularly adjusted with respect to the arm 3, and locked in position with respect to the arm 3, and thereafter the arms 3 and 4 will move as a unit. A movable member 10 is attached to the arm 3, so that it may be moved with respect to the arm 3, either linearly, as shown, or with other motion as required. Mounted on one of these members, such as the pivoted arm 3, may be an efficiency indicator shown at 11.

Referring to Fig. 3, which shows the reverse side, there is, in addition to the rotatable dial 5 and the rotatable transparent arm 6, a movable member 12, arranged to move in a guide 13—13. Pivotally connected to the movable member 12 is an arm 14. The pivot, or axis 15, of the arm 14, is so positioned on the movable member 12 and the guide 13—13 so arranged that as the member 12 is moved in the guide, this pivot 15 will move along a radial line from the axis 16 of the rotatable dial 5.

The upper of the two guide members 13—13 also serves as a part of the slide rule 17 by means of which any desired supplemental calculations may be carried out, such for example as the total distance traveled and total fuel consumed, as illustrated.

Figure 4:
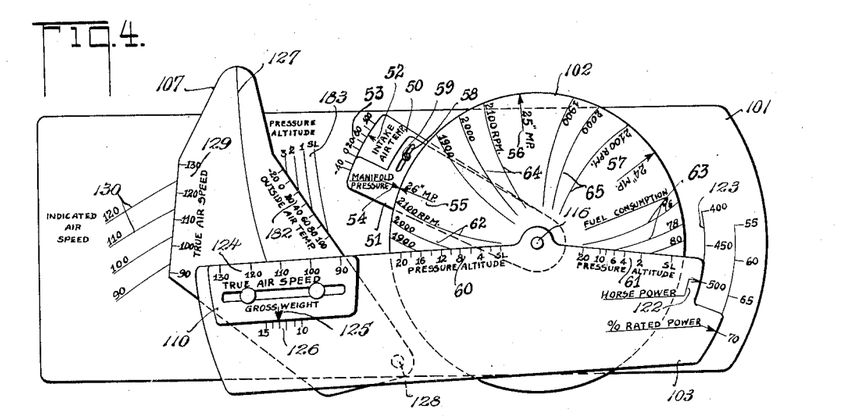
Fig. 4 is a plan view of one side of a calculator similar to that shown in Figs. 1, 2 and 3, but in a slightly modified form adapted for use where fuel economy is of utmost importance, such as long range flights.

The construction of the modified form of calculator shown in Fig. 4 follows generally that of Figs. 1, 2 and 3. The instrument incorporates a frame 101, rotatable disc 102, rotatable arms 103 and 107, and movable member 110. In addition, it carries arms 50 and 51, pivotally mounted to the frame 101, by means of the same pivot 116. Arm 51 is provided with a slot 58 in which may move the lock screw 59 carried by the arm 50, whereby the arm 51 may be adjusted with respect to the arm 50 and then locked in place so that thereafter arms 50 and 51 are rotated as one.

Figure 5:
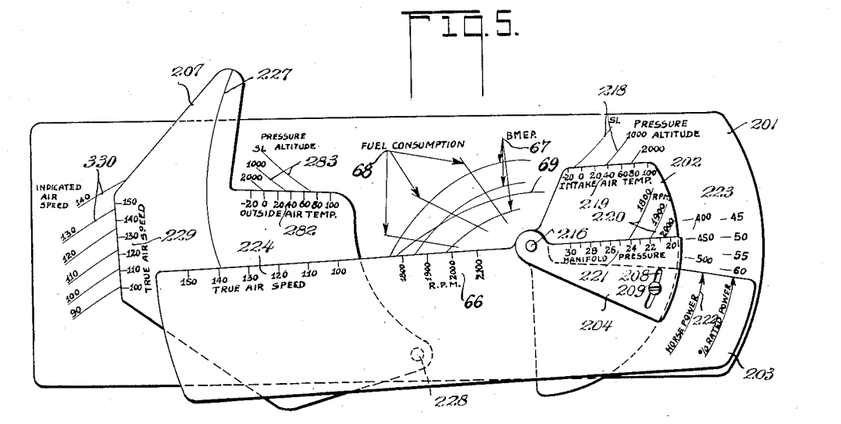
Fig. 5 is a plan view of one side of a calculator, also similar to that shown in Figs. 1, 2 and 3, showing a further modification.

The construction of the calculator shown in Fig. 5 is much the same as that of Figs. 1, 2 and 3. The modification consists of cutting away the left half of the rotatable disc 202 and moving the arm 204 with its locking means 208 and 209 to the right of the pivot 216.

Figures 6, 7:
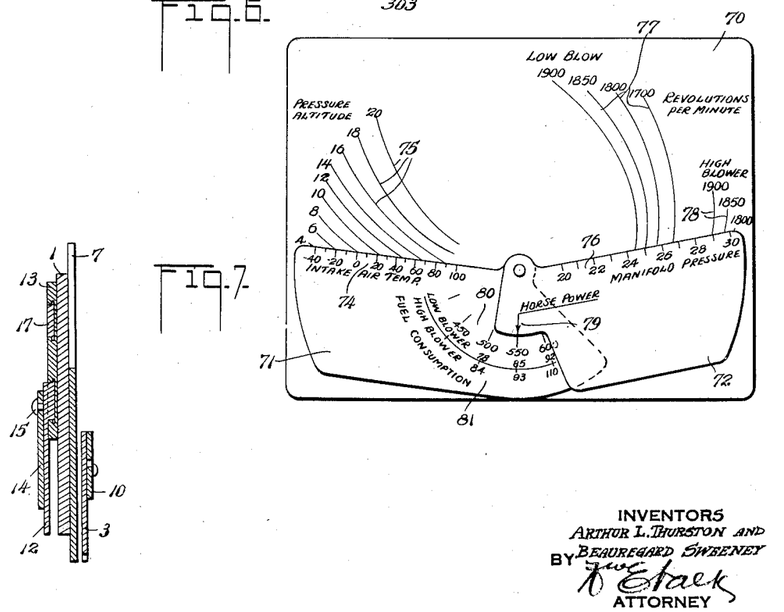
Fig. 6 is a modified form of that section of the instrument dealing only with engine performance.
Fig. 7 is a sectional view of the instrument shown in Figs. 1, 2 and 3.

The calculator shown in Fig. 6 consists of a support or frame member 70 on which two arms 71 and 72 are pivotally mounted at 73. Although no adjustment is shown, the method for accomplishing it should be apparent from the examples set forth above. For example, the arm 72 may be made up of two arms adjustable with respect to each other, one part bearing the index arrow 79 and the other the scale 76.

Figure 8:
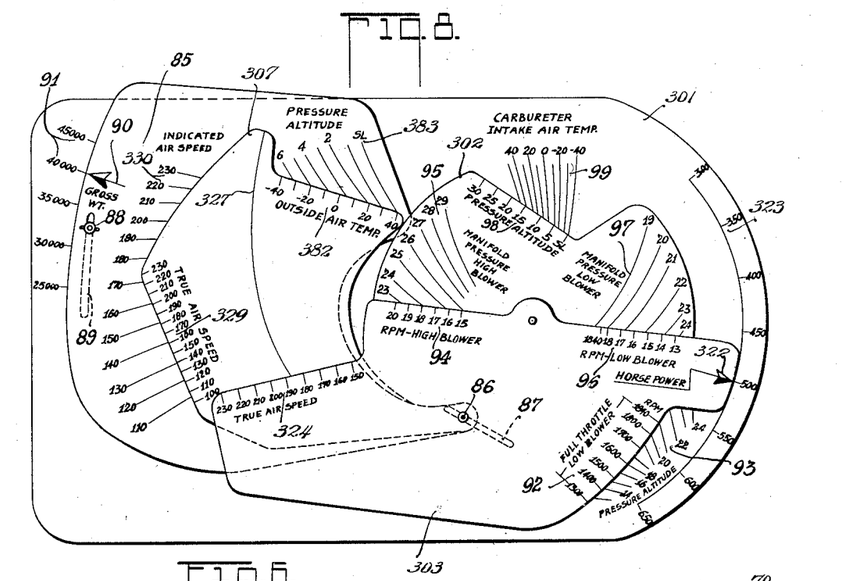
Fig. 8 is a view of one side of a calculator similar to that shown in Figs. 1, 2 and 3, but in a modified form adapted for use in cases where the gross weight is subject to wide variation.

The calculator shown in Fig. 8 differs somewhat in structure from that of Figs. 1, 2 and 3. An additional adjustable member 85 is movably mounted on the base member 301 by means of the screws 86 and 88 inserted snugly in holes in the member 85 and moving in the slots 87 and 89 respectively in the base member. Screw 86 also serves as the pivot for the movable member 307. Screw 88 is equipped with a thumb nut for clamping the member 85 in the desired adjusted position.

The foregoing describes the mechanical arrangement of several forms of the calculator. As will be seen from the illustrations, the several rotatable discs, arms and movable members are so shaped and located that scales and curves of the airplane and engine variables and the resulting performance may be inscribed thereon in desired relation so that the movement of the various members with respect to each other will give the desired information. The character of the scales and curves, the method by which they are estimated, and the procedure for operating the several examples of the calculator, as given in the descriptive matter which follows, will more fully explain the nature of the invention.

Referring to Fig. 1, it will be noted that the rotatable disc has a portion cut away in the upper right sector to provide an edge along which the scale of intake air temperature 19 is inscribed, and that in conjunction with this scale there is a family of curves 18 labeled "Pressure altitude" inscribed on the frame 1. The scale and curves are so arranged that when the disc 2 is rotated until the pressure altitude curve corresponding to the existing altimeter reading intersects the scale edge at the point corresponding to the existing carburetor air intake thermometer reading, the angular displacement of the disc 2 with respect to the frame 1 will represent the effect of the atmospheric pressure (generally expressed as pressure altitude) and the temperature of the air entering the carburetor upon the rake horsepower of the engine.

On the left half of the disc 2 there is inscribed a family of curves 20 labeled "R. P. M." In cooperation with these curves there is provided along the upper edge of the arm 4, a scale of manifold pressure 21. The right end of the arm 3 is cut away in a series of steps to provide for the inscription of three index arrows, i. e., horsepower 22, percentage of rated power 48, and fuel consumption 46. In conjunction with these indices, there are marked on the frame 1, the corresponding scales 23, 49 and 47.

The curves of R. P. M. and the manifold pressure and horsepower scales, as will be obvious to one familiar with the graphical representation of engine power characteristics, are in effect merely a transposition to polar coordinates of the usual rectangular coordinate curves of horsepower against manifold pressure at constant R. P. M. Then, if the arm 3 is rotated so that the R. P. M. curve corresponding to the existing tachometer reading intersects the manifold pressure scale at the point corresponding to the existing manifold pressure gauge reading (the disc 2 having been adjusted as directed above), the brake horsepower may be read on scale 23 opposite the arrow 22.

The R. P. M. curves representing the average results for a given engine model or series are laid out with the two arms 3 and 4 adjusted to bring the screw 9 in the middle of the length of the slot 8. Adjustment of the arm 4 with respect to the arm 3, either side of this mid-position will then compensate for the variation of an individual engine from the average. This adjustment may also be used to provide for the gradual loss of power of an engine with length of service.

On the arm 7 there is inscribed a curve 27, which represents the aerodynamic characteristics of the airplane. It will be recognized as a "power required" curve transposed to polar coordinates. Cooperating with this curve is a scale labeled "True Air Speed" along the top edge of the slide 10, which is carried on the arm 3, the angular position of which represents the engine brake horsepower.

If the arm 7 were not movable, it would be necessary to provide a family of curves, one for each of several altitudes. If this were done, it would be observed that all of these curves have almost identical curvature throughout the range usually involved in cruising flight and that a single curve placed on a rotatable arm with a proper location for the axis or rotation can be made to coincide with each of these curves. This is done on the calculator by suitably locating the pivot for the arm 7, as at 28.

It will be observed also that the angle through which it is necessary to rotate the arm to make the single curve coincide with the curve for any altitude is a function of that altitude. On the calculator the upper right portion of the arm 7 is cut away to an edge along which is inscribed the air temperature scale 82. Cooperating with this scale, there is inscribed on the frame 1, a family of curves 83 labeled "Pressure altitude." These curves are so laid out in relation to the air temperature scale that when the arm 7 is rotated to make the curve corresponding to the existing altimeter reading intersect the scale 82 at a point corresponding to the existing outside air thermometer reading, the angular setting of the arm 7 will be that required to locate the curve 27 in its proper position for the altitude determined by this pressure and temperature.

To take into account the effect of gross weight of the airplane upon its airspeed, the slide 10 is provided along its lower edge with an index arrow 25 which cooperates with the weight scale 26 inscribed on the arm 3. With the arrow 25 set opposite the gross weight on the scale 26 and with the arms 3 and 7 set for engine power and altitude respectively as directed above, the true airspeed of the airplane is given by the intersection of the curve 27 with the scale 24.

Since the angular position of the arm 7 is a function of altitude, it may be used to show the relation between true and indicated airspeeds at any altitude. This is done on the calculator by inscribing on the frame 1, the curves of indicated airspeed 30, in conjunction with the scale of true airspeed 29 marked on the arm 7. These show the relation between True and Indicated Airspeed when the arm 7 is set at the proper Pressure Altitude and Outside Air Temperature by means of curves 83 and scale 82.

An efficiency indicator is shown attached to the arm 3, which has a rotatable disc 11 pivotally attached to the arm 3. A scale 31 marked "Speed M.P.H." is inscribed on the arm 3; a scale 32 marked "Gal. hr." inscribed on disc 11; an index arrow 33 marked "Miles per gal." also inscribed on disc 11; and a "miles per gallon" scale 34 inscribed on the arm 3. The disc 11 is rotated until the number of gallons per hour, on the scale 32, is opposite the number of miles per hour on the scale 31, and the miles per gallon or efficiency read on the scale 34 at the index 33.

A scale 47 is inscribed on the frame 1 for use in conjunction with an index arrow 46 marked "Fuel consumption" on the arm 3. This shows the fuel consumption for a unit of time when the proper setting has been made of the arm 3. In the type of instrument shown in Fig. 1, the fuel consumption is assumed to have a definite relation to horsepower, which is a condition closely approximated by most aircraft. A modification of the instrument, to suit conditions where this relationship is not maintained, will be described hereinafter.

The procedure for laying out and locating the various curves and scales is as follows:

The first step is the computation of data required for establishing the curves. From test data furnished by the engine manufacturer, determine the manifold pressure required to produce, at sea level and at each of several different R. P. M. normally used, each of several horsepowers within the range of power covered in cruising operation with the given engine. Tabulate the results as in Table I.

*Table I*

| Horsepower | Manifold pressure at sea level at— | | | |
| --- | --- | --- | --- | --- |
| | 1600 R. P. M. | 1700 R. P. M. | 1800 R. P. M. | 1900 R. P. M. |
| 650 | 33.5 | 32.6 | 31.6 | 30.7 |
| 600 | 31.8 | 30.9 | 30.0 | 29.2 |
| 550 | 30.1 | 29.3 | 28.4 | 27.6 |
| 500 | 28.4 | 27.6 | 26.8 | 26.1 |
| Etc. | | | | |

From the same test data, determine, for any one combination of R. P. M. and manifold pressure the engine power produced at each of several different standard (or density) altitudes and compute the increment in power for each increment in altitude. This increment will be the same for any combination of R. P. M. and manifold pressure for a given engine. Tabulate the results as in Table II.

*Table II*

| Std. altitude | Brake horsepower at 1800 R. P. M. and 28.4" man. press. | Increment |
| --- | --- | --- |
| S. L. | 550 | |
| 2000 | 571 | 21 |
| 4000 | 591 | 20 |
| 6000 | 611 | 20 |
| 8000 | 630 | 19 |
| etc. | | |

By means of the formula $$\frac{\text{Actual H. P.}}{\text{H. P. at standard temperature}} = \sqrt{\frac{460+\text{standard temperature (F.)}}{460+\text{actual temperature (F.)}}}$$

determine the various combinations of air intake temperature and atmospheric pressure—expressed as pressure altitude—which from the standpoint of power output are equivalent to each of several standard altitudes. This determination is made by computing the actual temperature required at any pressure altitude to produce a selected horsepower with a combination of manifold pressure and R. P. M. which would produce this power at each of the standard altitudes. The horsepower selected for this computation should be that most commonly used in cruising operation. For example, if 550 H. P. is the selected horsepower and 4000 ft. is one of the standard altitudes considered, then from Table II is noted the fact that if the combination of manifold pressure and R. P. M. is such as to produce 550 H. P. at 4000 ft. standard altitude, it would produce only 530 H. P. at a pressure altitude of 2000 ft. and standard 2000 ft. temperature which is 51.9° F. Therefore to produce 550 H. P. with this combination with 2000 ft. pressure altitude, the actual temperature must be $$T_{act.} = \left(\frac{530}{550}\right)^2 (460 + 51.9) - 460 = 14.9°$$

Similarly with a pressure altitude of 6000 ft., the power with standard 6000 ft. temperature (37.6°) would be 570 H. P. and to give 550 H. P. the actual temperature must be $$T_{act.} = \left(\frac{570}{550}\right)^2 (460 + 37.6) - 460 = 73.3°$$

Computations are made for the range of standard altitudes concerned and the results tabulated as in Table III.

*Table III*

| Std. alt. | Temperature for std. alt. power of 550 H. P. at pressure alt. of— | | | |
|---|---|---|---|---|
| | S. L. | 2000 | 4000 | 6000 etc. |
| S. L. | 59.0 | 92.1 | 123.6 | |
| 2000 | 19.8 | 51.9 | 82.6 | 111.9 |
| 4000 | −16.2 | 14.9 | 44.7 | 73.3 |
| 6000 | −49.4 | −19.2 | 9.8 | 37.6 |
| 8000 | | −50.5 | −22.3 | 4.8 |
| etc. | | | | |

Fuel consumption data are ordinarily furnished in the form of a curve of specific fuel consumption vs. B. H. P. This is converted to actual consumption in gallons per hour by means of the formula Fuel cons. (gal./hr.) =

$$\frac{\text{B. H. P. per engine} \times \text{number of engines} \times \text{spec. fuel cons.}}{6}$$

From airplane data which is usually furnished by the airplane manufacturer in the form of a curve of brake horsepower required vs. speed in level flight at some standard altitude—generally sea level—with normal gross weight, compute horsepower vs. speed at other standard altitudes using the formulae $$\frac{V_2}{V_1} = \sqrt{\frac{\rho 1}{\rho 2}} \text{ and } \frac{HP_2}{HP_1} = \sqrt{\frac{\rho 1}{\rho 2}}$$

wherein $V_1$ and $HP_1$ are respectively the speed and the horsepower at an altitude of density $\rho_1$ and $V_2$ and $HP_2$ are the corresponding values at a density $\rho_2$. Tabulate the results as in Table IV.

*Table IV*

| Sea level | | 5,000 ft. | | 10,000 ft. | |
|---|---|---|---|---|---|
| $\sqrt{\rho_1/\rho_2}=1.0$ | | $\sqrt{\rho_1/\rho_2}=1.077$ | | $\sqrt{\rho_1/\rho_2}=1.164$ | |
| B. H. P. | M. H. P. | B. H. P. | M. H. P. | B. H. P. | M. H. P., etc. |
| 350 | 126 | 377 | 136 | 407.5 | 147 |
| 400 | 137 | 431 | 147.5 | 465.5 | 159.5 |
| 450 | 147 | 484.5 | 158 | 524 | 171 |
| 500 | 156 | 538.5 | 168 | 582 | 181.5 |
| 550 | 163.5 | 592.5 | 176 | 640 | 190 |
| 600 | 170 | 646 | 183 | 698.5 | 198 |
| etc. | | | | | |

Determine the various combinations of pressure—expressed as pressure altitude—and air temperature which are equivalent to each standard altitude. For this use standard altitude data universally available and the formula $$\sigma = 17.32 \frac{P}{460 - T}$$

wherein
$\sigma$ = relative density (which defines the std. alt.)
P = atmospheric pressure in ins. Hg
T = air temperature in degrees F.

Tabulate the results as in Table V.

*Table V*

| Standard altitude | Temperature for std. alt. with pressure alt. of— | | | | |
|---|---|---|---|---|---|
| | S. L. | 2000 | 4000 | 6000 | 8000 |
| S. L. | 59.0 | 22.7 | −13.0 | | etc. |
| 2000 | 89.7 | 51.9 | 15.4 | −19.7 | |
| 4000 | | 82.5 | 44.7 | 8.4 | −27.0 |
| 6000 | | | 75.5 | 37.6 | 1.3 |
| 8000 | | | 108.0 | 68.5 | 30.5 |
| etc. | | | | | |

Compute horsepower vs. speed in level flight at the average standard altitude for cruising operation with each of several gross weights, using the formulae $$\frac{V_2}{V_1} = \left(\frac{W_2}{W_1}\right)^{1/2} \text{ and } \frac{HP_2}{HP_1} = \left(\frac{W_2}{W_1}\right)^{3/2}$$

wherein $V_1$ and $HP_1$ are the speed and horsepower with gross weight $W_1$ and $V_2$ and $HP_2$ are corresponding values for gross weight $W_2$. Tabulate results as in Table VI.

*Table VI*

| Brake horsepower and speed @ 5000 ft. with gross weight of— | | | | | |
|---|---|---|---|---|---|
| 24,000 lb. | | 20,000 lb. | | 16,000 lb. | |
| (From Table IV) | | $\left(\frac{W_2}{W_1}\right)^{1/2}=.761$ | $\left(\frac{W_2}{W_1}\right)^{1/2}=.913$ | $\left(\frac{W_2}{W_1}\right)^{1/2}=.544$ | $\left(\frac{W_2}{W_1}\right)^{1/2}=.817$ |
| B. H. P. | M. P. H. | B. H. P. | M. P. H. | B. H. P. | M. P. H. |
| 377 | 136 | 287 | 124 | 205 | 111 |
| 431 | 147.5 | 328 | 134.5 | 234.5 | 120.5 |
| 484.5 | 158 | 368.5 etc. | 144.5 | 264 | 129 |

Plot the data in the form of curves of speed vs. horsepower and from the curves obtain by inspection the speed obtained with the aforementioned selected horsepower at each gross weight.

Airspeed meter calibration data is generally furnished by the airplane manufacturer in the form of a curve or chart of true air speed vs. indicated airspeed at sea level standard altitude. The relation between indicated airspeed and true airspeed at any other standard altitude is given by the expression $$TAS = TAS_0 \times \sqrt{\frac{1}{\sigma}}$$

wherein
 TAS=true airspeed at altitude, corresponding to a given indicated airspeed
 TAS$_0$=true airspeed at sea level corresponding to said indicated airspeed
 $\sigma$=relative air density at said altitude Tabulate the results of computations as in Table VII.

*Table VII*

| Standard altitude | $\sqrt{\frac{1}{\sigma}}$ | True air speed for an indicated air speed of— | | | | | |
|---|---|---|---|---|---|---|---|
| | | 140 M. P. H. | 150 M. P. H. | 160 M. P. H. | 170 M. P. H. | 180 M. P. H. | 190 M. P. H. |
| S. L. | 1.00 | 142.3 | 151.9 | 161.5 | 171 | 180.6 | 190 |
| 2000 | 1.030 | 146.6 | 156.7 | 166.5 | 176.3 | 186 | 195.7 |
| 4000 | 1.061 | 151.2 | 161.3 | 171.5 | 181.6 | 191.8 | 201.3 |
| 6000 | 1.094 | 155.8 | 166.2 | 176.9 | 187.0 | 197.3 | 207.6 |
| etc. | | | | | | | |

The data having been obtained, the next step is the laying out of the various curves and scales. There is nothing arbitrary about the size and shape of the various members but the general configurations shown will be found to give good intersections and easy reading.

The horsepower scale 23 is laid out on the base 1, as shown, with uniform spacing and using about 75° of arc to cover the range of power which may be used in cruising operation. Scribe also the horsepower index arrow 22 on the edge of arm 3, as shown. Scribe the uniformly spaced scale of manifold pressure 21 to include the extreme values determined in the computations. Tighten the screw 9 in mid-position in the slot 8.

Mark the uniform temperature scale 19 along the edge of the disc as shown, rotate the disc so that this edge slopes upward to the left by about 10°, and clamp the disc to the base. Move arm 3 to bring the index 22 to a reading on scale 23 corresponding to one of the horsepower values used in the computations. Using the data from Table I, mark a point on the disc 2 along the edge of scale 21 at the manifold pressure required to produce this horsepower at each of the several R. P. M. considered. Repeat this operation for each of the other horsepowers considered and draw a curve through the points pertaining to each R. P. M. The result will be the family of curves 20.

Set the index 22 at the sea level power used in the computations of Table II and clamp the arm 3 to the disc 2. Mark a temporary or working index on disc 2 at any convenient point—generally on the left side—and opposite this index on base 1 indicate a temporary or working mark labelled S. L. Release the clamp holding the disc to the base and move the disc—and arm 3 secured to it—to set the index 22 successively at the values obtained in Table II at standard altitudes of 2000 ft., 4000 ft., etc. and at each position of the working index make a working mark on the base correspondingly labelled 2, 4, etc.

Set the working index at one of the standard altitude working marks and, using the data from Table III, mark a point on the base along the edge of the scale 19 at the temperature required to give the selected power at each of the several pressure altitudes. Repeat the operation for each of the standard altitudes and join the points pertaining to each pressure altitude, obtaining the family of curves 18.

The scales 31, 32 and 34 are logarithmic, the combination being that of a circular slide rule for computing the miles per gallon from the formula $$\text{Miles per gallon} = \frac{\text{miles per hour}}{\text{gallons per hour}}$$

The layout of the scales 49 and 47 in conjunction with the indices 48 and 46 is straightforward and obvious.

For the airplane performance portion of the calculator, scribe the uniform airspeed scale 24 on the edge of the slide 10, as shown. If the performance computations have been carried out with normal gross weight, set the slide toward its extreme left position; if an average gross weight was used, set the slide in mid-position.

Fasten the member 7 in some arbitrary position on the base, marking a working index along the edge of the member at a convenient point and corresponding working mark, labelled 5000, opposite it on the base. Using the data from Table IV, set the index 22 at the horsepower corresponding to a given speed—with the gross weight used for the computations—at 5000 ft. (the average altitude anticipated in cruising operation) and mark a point on member 7 along the edge of the scale 24 at that speed. Repeat the operation for other speeds at said altitude and join the points to obtain curve 27.

The location of the pivot point is determined by trial. Try some point in the general location of that shown at 28. Set the index 22 at the power corresponding to some speed at sea level and rotate member 7 about the trial pivot until the curve 27 intersects the scale 24 at that speed. Hold member 7 in this position and check the pivot location by moving arm 3 to bring the index 22 to the power corresponding to the several other speeds at sea level and noting whether the curve 27 intersects the scale 24 properly at these speeds. Repeat for other standard altitudes. After a few tries a pivot point location will be found such that by rotating member 7 about it the curve 27 will be so positioned as to give readings of airspeed checking with the computed values at all altitudes within plus or minus one M. P. H.

Having properly located the pivot point rotate member 7 to positions corresponding to the several standard altitudes and opposite the working index make working marks on the base appropriately labelled with pertinent altitude. Scribe the uniform air temperature scale 82 along the edge of member 7, as shown. With member 7 set to bring the working index to each of the standard altitude working marks, mark points on the base along the edge of scale 82 at the temperature—obtained from Table V—which, with each of the pressure altitudes used, will give the standard (density) altitude at which member 7 is set. Join the points pertaining to each pressure altitude, to obtain the family of curves 83.

Scribe the airspeed scale 29 along the edge of member 7 as shown. With the working index again set at each of the standard altitude working marks and using the data from Table VII, mark a point on the base along the edge of scale 29 at the true airspeed corresponding to each of the several indicated airspeeds at the altitude at which member 7 is set. Join the points pertaining to each indicated airspeed to obtain the family of curves 30.

Set the member 7 at the average altitude selected for the computations and set the index 22 at the selected power. Scribe the gross weight index 25 on the slide 10 as shown and opposite it on the arm 3 scribe a line which is labelled with the gross weight used in the computations. With the other members stationary, move the slide 10 until the curve 27 intersects the scale 24 at a speed corresponding to each of the other gross weights for which computations were made as per Table VI. Scribe a line on the arm 3 at each of the corresponding positions of the index 25 and label these lines with the appropriate gross weights.

The several working marks and indices may then be removed.

Referring to Fig. 3, which shows the mechanism for determining the effect of the wind on the performance of the aircraft with respect to the ground, the rotatable dial 5 has inscribed around its edge a scale 35, of degrees from 0 to 360, commonly called a "compass rose." The transparent rotatable arm 6 has a velocity scale 36 inscribed on it along a line extending radially from its pivot 16 and ending in the arrow point 37. The sliding member 12 has inscribed thereon an index arrow 38, marked "ground speed" which is used in conjunction with the scale 39 on the upper guide 13. The arm 14, which is pivotally connected to the sliding member 12 at 15, has a scale 40 marked "True air speed" inscribed along its upper edge which is on a radial line from the pivot 15. The arm 14 also has a protractor 41 marked "Angle of drift" "Right (—)" and "Left (+)." An index arrow 42 is inscribed on the member 12 which is used in conjunction with the "Angle of drift" protractor 41. An index arrow 43, marked "True course" is inscribed on the frame 1 at the edge of the dial 5 and in a straight line with pivot points 15 and 16. The velocity scale 36, the true airspeed scale 40, and the ground speed scale 39, are all made to the same scale or reduction. The ground speed index 38 and scale 39 are so arranged that they register the distance, to the speed scale, between the pivot points 15 and 16. The true air speed scale 40 is laid out with its "0" at pivot point 15, that is, it registers the distance along a radial line from pivot point 15. The velocity scale 36 also registers the distance along a radial line from the pivot point 16.

In operation, the dial 5 is rotated until the desired course over the ground is opposite the "true course index" 43. Arm 6 is rotated until its arrow 37 is over the degree mark on the dial 5 from which direction the wind is blowing. The slide 12 and arm 14 are moved until the true airspeed of the plane on the scale 40 intersects the scale 36 at the existing wind velocity, as at the point 44. The ground speed is read on the scale 39 at index arrow 38. To determine the proper heading for the aircraft to make the course good, the angle of drift is read on the drift protractor 41 at index 42 and added to the true course angle if it is "left drift" and subtracted from true course angle if "right drift."

In this operation it can be seen that a vector diagram, consisting of the triangle whose vertices are the points 15, 16 and 44, is set up and solved. The ground speed vector is represented by the distance between 15 and 16; the wind velocity vector is represented by the distance between 16 and 44; and the true airspeed vector is represented by the distance between 15 and 44. The angle of drift shown on the protractor 41 at index 42 is the same as the angle between a line from 15 to 16 and a line from 15 to 44. When the settings are made on the dial 5 and the arm 6, the angle between a line from 16 to 43 and a line from 16 through 44 to 37, is the angle between the wind and the desired course.

Above and below the true course index 43, Fig. 3, are scales 45 inscribed on the frame 1 marked "double drift," "right" and "left." These are used in connection with the so-called "double drift" method of determining an unknown wind direction and velocity. The procedure involves a knowledge of the true airspeed and measurement—by means such as a drift indicator—of angle of drift when flying on each of two headings at an angle to each other. The dial 5 is rotated so that the first heading of the aircraft on the scale 35 is opposite the mark on the scale 45 corresponding to the angle of drift obtained on the first heading. The member 12 is moved so that the index arrow 38 is opposite the true airspeed on the scale 39. The arm 14 is rotated until the index arrow 42 is opposite the angle of drift obtained on the first heading on protractor 41. A pencil line is marked on the dial 5 along the upper edge of the arm 14. Such a line is shown as 84. The dial 5 is next rotated until the second heading on the scale 35 is opposite the angle of drift, obtained on the second heading, on scale 45. The member 12 is moved so that the index arrow 38 is opposite the true airspeed on the scale 39. While usually the true airspeeds are the same on both headings they need not necessarily be so. The arm 14 is rotated until the index arrow 42 is opposite the angle of drift, obtained on the second heading, on the protractor 41. A second pencil line is drawn on the dial 5 along the upper edge of the arm 14. Such a line might be along the edge of the arm 14 as shown in Fig. 3. The intersection of the two lines would then be at the point 44. The arm 6 is then rotated until the line from 16 to 37 is over the intersection of the pencil lines at 44. The wind velocity is then read on the scale 36 of the transparent arm 6 at the intersection 44 of the pencil lines. The direction from which the wind is blowing is read on the scale 35 on the dial 5 at the point of the arrow 37 on the transparent arm 6.

The modification shown in Fig. 4 is one that applies particularly to the long range type of aircraft where fuel economy is of great importance. The calculator, of which one side is shown, was designed for use in connection with an engine which is operated in cruising flight at one of three manifold pressures, the desired power at the selected manifold pressure being obtained by suitably varying the R. P. M. The operation of the arm 107 in cooperation with the arm 103 is the same as previously described for Fig. 1. The method of determining engine power and the effect of engine variables is somewhat different, however, as will appear from the following description. On the arm 50, there is inscribed an index arrow 52 marked "Intake air temperature" used in conjunction with the scale 53 inscribed on the frame 101. The arm 51 has inscribed on it an index arrow 54 marked "Manifold pressure" oppose which any one of the index arrows, 55, 56 and 57, marked 26 "MP," 25 "MP" and 24 "MP" respectively, inscribed on the disc 102, may be placed by rotating this disc. The arm 51 is provided with a slot 58 and a locking screw 59 by means of which the arm 51 may be adjusted with respect to the arm 50, to take care of the variations of a particular engine or group of engines from the average, and then locked in place so that thereafter the arms 50 and 51 are rotated as one.

The arm 103 has inscribed on it a pressure altitude scale 60, to the left of the axis 116, and another pressure altitude scale 61 to the right of the axis 116. With arms 50 and 51 set in the proper position as determined by index 52 and scale 53, and with the disc 102 set so that index 55 on the disc is opposite index 54 on the arm 51, curves of R. P. M. 62 on disc 102 are used in conjunction with the pressure altitude scale 60; the angular displacement of the arm 103 being a function of the horsepower such as is shown by the horsepower index 122 and scale 123. At the same time the fuel consumption curves 63 are used in conjunction with the other pressure altitude scale 61. When the disc 102 is rotated to bring the index 56 on the disc opposite the index 54 on the arm 50, then the R. P. M. curves 64 and other curves of fuel consumption (not visible in the drawings because covered by arm 103) are used with the scales 60 and 61 respectively. Similarly, when the index 57 is placed opposite index 54, the R. P. M. curves 65 and a third set of fuel consumption curves (also not visible) are used.

While the procedure for laying out that portion of the calculator which deals with airplane performance is the same as that used for the calculator of Fig. 1, the engine portion is laid out in a somewhat different manner. The data usually furnished by the engine manufacturer generally consists of a set of curves for each of the three manifold pressures to be used, which in the examples shown are 24, 25 and 26 inches Hg. These curves—or tables—give the power output of the engine with a constant intake air temperature and with varying R. P. M. and pressure altitude. From these data determine the pressure altitude at which each of a number of horsepowers in the cruising range will be produced with each of several R. P. M. used for cruising. This determination is made for each of the manifold pressures used.

The engine manufacturer also furnishes fuel consumption data in the form of specific fuel consumption curves superposed upon the aforementioned power-pressure altitude—R. P. M. curves. First compute the power required with each of several specific fuel consumptions to give each of several values of consumption in gallons per hour. The formula used is the same as that given above for the fuel consumptions for the calculator of Fig. 1. The results—in the case of a two-engined plane—are tabulated as in Table VIII.

*Table VIII*

| Gals. per hour | Corresponding B. H. P. per engine, with spec. fuel cons. of— | | | | |
|---|---|---|---|---|---|
| | .43 | .44 | .45 | .46 | .47, etc. |
| 80 | 558 | 545 | 533 | 522 | 510 |
| 78 | 544 | 532 | 520 | 509 | 498 |
| 76 | 530 | 518 | 507 | 495 | 485 |
| etc. | | | | | |

Then on the graphs for each manifold pressure, plot a point on the .43 specific consumption curve at 558 H. P., on the .44 curve at 545 H. P., on the .45 curve at 533 H. P. etc. to give a curve showing the relation between H. P. and pressure altitude for a consumption of 80 gal. per hr. The corresponding curve for 78 gal. per hr. is obtained by plotting a point on the .43 specific consumption curve at 544 H. P., one on the .44 curve at 532 H. P. etc., and joining these points. Similar curves are plotted for the several other values of fuel consumption.

Correction for variation from constant air intake temperature is made on the basis of the approximation that 10° F. variation in temperature will change the horsepower by 1%, an increase in temperature resulting in a decrease in power and vice versa.

To layout the curves and scales, set screw 59 in mid-position in slot 58 and thereafter move arms 50 and 51 together. Mark the manifold pressure index 54 on arm 51 as shown and the air intake temperature index 52 on arm 50 as shown. Set the arms 50 and 51 approximately as shown and opposite the index 52 mark a line on base 101 labelled with the constant air intake temperature normally used in operation. Clamp the arms to the base in this position. Scribe the three manifold pressure indices 55, 56 and 57 on the disc 102 at approximately 60° intervals and label them with the appropriate pressure values to be used. Scribe the horsepower index 122 on the arm 103 and the uniform power scale 123 on the base as shown. Scribe the uniform pressure altitude 60 and the "telescoped" scale 61—an approximation to logarithmic spacing will give a convenient arrangement of the curves 63—on the edges of the arm 103 as shown.

Set one of the manifold pressure indices on disc 102 opposite the index 54 and set the horsepower index 122 at one of the powers used in the computations for the manifold pressure. Along the edge of the scale 60 mark a point on disc 102 at the pressure altitude at which this power will be produced at each of the several R. P. M. Also along the edge of the scale 61 mark a point on the disc at the pressure altitude at which this power will require each of the several fuel consumptions. Repeat for other powers and join the points pertinent to each R. P. M. and fuel consumption to give the families of curves such as 62 and 63. Repeat for the other manifold pressures.

Set index 122 at the power most commonly used in cruising operation, clamp arm 103, disc 102 and arms 50 and 51 together, and release the clamp holding arms 50 and 51 to base 101. Move index 122 to a power 1% greater than that selected and opposite the index 52 mark a line on base 101 labelled with a temperature 10° F. less than the constant value. Repeat with powers 2%, 3%, etc. greater making marks on the base labelled 20°, 30°, etc. less than the constant temperature and with powers 1%, 2%, etc. less than that of the selected power, making marks labelled 10°, 20°, etc. greater than the constant temperature.

Fig. 5 shows one side of a calculator similar to that shown in Figs. 1, 2 and 3, but with the engine power unit modified to provide a determination of brake means effective pressure. The establishment of pressure altitude curves 218 in conjunction with the air intake temperature scale 219 and of the R. P. M. curves 220 in conjunction with the manifold pressure scale 221 is the same as described above for the construction shown in Fig. 1.

In the space made available by the cutting away of the left portion of the disc 202, curves of B. M. E. P. 67, and fuel consumption 68 are inscribed on the frame 201, in conjunction with the scale of R. P. M. 66 along the top edge of the arm 203. These curves are merely transposition to polar coordinates of curves of R. P. M. against brake horsepower at constant fuel flow and constant B. M. E. P. A limit curve such as 69 may be superimposed on the B. M. E. P. curves for the purpose of showing the maximum B. M. E. P. permissible at any R. P. M.

The procedure for laying out this calculator is the same as for that of Fig. 1, except for the curves of B. M. E. P. 67 and fuel consumption 68. Data for the former are obtained by using the formula $$B. M. E. P. = \frac{792{,}000 \times \text{horsepower}}{R. P. M. \times \text{displacement}}$$

to compute the R. P. M. at which each of several values of B. M. E. P. will correspond to each of several values of horsepower. The fuel consumption computations are similar to those set forth above for the calculator of Fig. 4. The procedure for laying out the curves on the base 201 will be apparent from the instructions given above for the calculators of Figs. 1 and 4.

The modified form of calculator shown in Fig. 6 deals only with engine power and the variables affecting it. The instrument shown is for use with an engine having two different supercharger drive gear ratios. From the following description of the nature of the various curves and scales and in the light of the directions set forth above for the other calculators, the procedure for laying out this calculator will be obvious.

The curves of pressure altitude 75 on the frame 70 in conjunction with the scale 74 on the arm 71 are established in the same manner and serve the same purpose as the corresponding curves 18 and scales 19 of Fig. 1.

The same is true of the R. P. M. curves 77 and 78 inscribed on the frame 70, in conjunction with the manifold pressure scale 76 marked on the arm 72, except that there are two families of curves, one 77 labeled "Low blower" for use when the low ratio supercharger drive is engaged and the other 78, labeled "High blower" for use when the high gear ratio is engaged. The index 79 labeled "Horsepower" on the arm 72 reads on the horsepower scale 80 and fuel consumption scale 81 marked on the arm 71.

While the adjustable member 10, of Figs. 1 and 4 is sufficient for the determination of the effect of gross weight in cases where the latter does not vary over a wide range, the device shown in Fig. 8 is preferable in cases of large variation of gross weight. In the embodiment shown, the means for the determination of engine power output are similar to those described above, except that the plotting is reversed. Curves of intake air temperature 99 are plotted on the base 301 and the scale 98, along the edge of the cutaway portion of the disc 302, is that of pressure altitude. Similarly the curves of manifold pressure 95 and 97 are plotted on the disc 302, for cooperation with the scales of R. P. M. 94 and 96 inscribed along the edge of the arm 303. The index arrow 322 and horsepower scale 323, however, are similar to those previously described.

Curves of pressure altitude 93, inscribed on the base member 301, are laid out in cooperation with the scale of R. P. M. 92 marked on the edge of the arm 303, in such a way as to make possible the determination of the altitude at which full throttle opening is required in order to develop, at any R. P. M., the power indicated by any angular position of the arm 303, and hence the altitude above which the pilot should shift to the high blower gear ratio in order to be able to maintain that power at that R. P. M.

As has been noted above, for moderate variations in gross weight, the radial shifting of the airspeed scale 24—by sliding the member 10— with respect to the power required curve 27 is sufficiently precise for all practical purposes. In cases where the gross weight varies widely, however, a more exact shifting of the one with respect to the other is desirable. This is accomplished in the device of Fig. 8 by shifting the power required curve 327.

This curve 327, as well as the scales of true airspeed 329 and atmospheric temperature 382, is inscribed on the arm 307, as in the calculator of Fig. 1. The corresponding curves of indicated airspeed 330 and pressure altitude 383, however, are inscribed on the added adjustable member 85. On this member there is also marked a gross weight index 90 which reads on the gross weight scale 91 marked on the base member 301. As may readily be seen, the movement of the member 85 is governed by the travel of the screws 86 and 88 in the slots 87 and 89, and when member 85 is moved it carries with it the scales 329 and 382 and the pivot 86 for the arm 307. Thus the curve 27 is shifted with respect to the scale 324. The markings 90 and 91, the slots 87 and 89 and the screws 86 and 88 are so arranged that this shift accurately represents the effect of gross weight on power required.

If the index 90 is set opposite the pertinent gross weight on scale 91, computations involving airspeed, power, altitude, etc. may be made by manipulation of members 302, 303 and 307 as set forth above and the results will be accurate for flight at that weight.

The data to be computed for this calculator are the same as for that of Fig. 1 except that instead of determining the manifold pressure required to give a certain power at a certain R. P. M., it is expedient to determine the R. P. M. required to give that power with a certain manifold pressure. Similarly instead of computing air intake temperatures for a certain pressure altitude, the temperature is assumed and the altitude determined.

The procedure for laying out the portion of the calculator pertaining to engine power is similar to that used in the Fig. 1 construction. The airplane performance portion is laid out somewhat differently as follows:

Fasten a piece of drawing paper on the base 301. Then using the airspeed scale 324 and the H. P. scale 323 with the index 322, and using data such as in Table IV, plot on this paper a family of power curves like the curve 327, one each for S. L., 5000 ft., 10,000 ft., etc. and with the normal—or average—gross weight. On a piece of tracing paper, trace the curve for an average altitude of cruising operation, say 5000 ft. Then by trial and error locate a pivot point 86 such that when the tracing is rotated about this point the traced curve will superpose on each of the curves plotted on the paper. Mark an altitude reference index on the tracing and under each of the positions of this index corresponding to superposition of the traced curve on an altitude power curve, make a reference mark on the paper labelled with the appropriate altitude.

Plot on the paper, as above, but using the data such as that in Table VI, a family of curves of power at the average altitude with the various gross weights. Mark a reference point such as 88 and an index such as 90 on the tracing and shift the tracing so as to make the traced curve superpose on the several curves of this family. For each such superposed position make a mark on the paper under the points 86 and 88 on the tracing and opposite the index 90 mark a line labelled with the appropriate gross weight.

Transfer from the tracing to member 307 the traced curve as 327, the pivot point 86 and the altitude reference index. Transfer from the tracing to member 85 the points 86 and 88 and the gross weight index 90. From the paper transfer to the member 85 the altitude reference marks and transfer to the base 301 the various positions of the points 86 and 88 and the gross weight marks as at 91. A line joining the various positions of the point 88 on the base determines the center line of slot 89, while the line through the various positions of point 86 determines the center line of slot 87.

The scales 382 and 329 are scribed, and the curves 383 and 330 laid out with the aid of the standard altitude reference index and reference marks in the manner prescribed for the corresponding curves 83 and 30 of Fig. 1.

In any of the embodiments shown in Figs. 1, 4, 5 and 8, additional calculations may be made possible by making the disc 2 transparent and inscribing under it on the base member 1, additional curves—such as fuel consumption curves, for example—which can be used in cooperation with the scales inscribed along the upper edge of the arm 3.

A better understanding of the nature of the invention may be obtained from an illustrative example, as shown in Figs 1 and 3. It should be understood that the sequence of operations may be changed to fit any particular set of conditions. It is also assumed that the arm 4 has been suitably adjusted with respect to the arm 3 and locked in position.

It is desired to fly on a course of 340° over the ground and maintain a speed over the ground of 150 M. P. H. The altimeter registers 4000 feet (pressure altitude) and the outside air temperature is 40°. The carburetor intake air is being heated to 60°. The wind velocity at this altitude is 30 M. P. H. from 265°. The gross weight of the aircraft is 8000 lbs.

We wish to determine:
1. What speed relative to the air (true air speed) is necessary to maintain the 150 M. P. H. ground speed.
2. What direction should the aircraft be headed.
3. What the manifold pressure should be for 1900 R. P. M.
4. What is the fuel consumption.
5. How many miles over the ground will be made for each gallon of fuel.
6. What should be the airspeed meter reading (indicated airspeed).
7. What horsepower is required.
8. What percent is this of the rated horsepower of the engine or engines.

OPERATION

Referring to Fig. 3. Rotate dial 5 so that 340 on scale 35 is opposite the true course index 43. Move member 12 until ground speed index 38 is opposite 150 on scale 39. Rotate arm 6 until index arrow 37 is over 265 on scale 35 on dial 5. Rotate arm 14 until its upper edge intersects scale 36 on arm 6 at the 30 mark. At this intersection read on scale 40 that the speed through the air (true air speed) must be 160 M. P. H. (Item 1.)

Read on the protractor 41 opposite index 42 that the angle of drift is 10° right (—). Subtract this 10° from the true course of 340° giving 330° which the aircraft must be headed (Item 2).

Turn to the other side of the instrument as shown in Fig. 1. Move member 10 until the index arrow 25 is opposite the 8000 mark on scale 26. Rotate disc 2 until the line marked 4000 of the pressure altitude lines 18 intersects the intake air temperature scale 19 at the 60° mark. Rotate arm 7 until the line marked 4000 of the pressure altitude lines 83 intersects the outside air temperature scale 82 at the 40° mark. Rotate the arm 3 until the curve 27 intersects the true airspeed scale 24 at the 160 mark. Read at the intersection of the 1900 line of the R. P. M. lines 20 and the manifold pressure scale 21, that 26 inches of manifold pressure are required (Item 3).

Read on scale 47 opposite the fuel consumption arrow 46, that 40 gallons per hour will be used (Item 4).

Rotate disc 11 until the 40 mark on scale 32 is opposite the 150 mark on scale 31. Read on scale 34 opposite the index arrow 33 that 3.75 miles over the ground will be made for each gallon of fuel (Item 5).

Opposite the 160 mark on scale 29 read that the indicated air speed or air speed meter reading should be 145. This reading is made at the intersections of lines 30 with the edge of the airspeed scale 29 (Item 6).

Read on scale 23 opposite the horsepower index 22 that the horsepower required is 480 (Item 7).

Read on scale 49 opposite the "% rated power" index 48, that the percent of rated power is 60% (Item 8).

Knowing the ground speed and fuel consumption the time to go any distance and the total fuel required may be calculated on the slide rule 17.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a calculator, a first member having inscribed thereon a family of curves and a scale, a second member mounted on and movable relatively to said first member, said second member also having inscribed thereon a curve and a scale, said scale being adapted for cooperation with the curves inscribed on said first member, and a third member mounted on and movable relatively to said first member, said third member having markings inscribed thereon for cooperation with the curve inscribed on said second member and also an index for cooperation with said scale on said first member whereby when all of the aforesaid members occupy a particular position the markings thereon indicate the relationship between several factors of a given problem.

2. In a calculator, a first member having inscribed thereon two different families of curves, a second member mounted on and movable relatively to said first member, said second member having inscribed thereon a curve and also markings adapted for cooperation respectively with the families of curves inscribed on said first member, and a third member movable in relation to said second member, said third member having inscribed thereon markings adapted for cooperation with the curve inscribed on said second member whereby when all of the aforesaid members occupy a particular position the markings thereon indicate the relationship between several factors of a given problem.

3. In a calculator, a first member having inscribed thereon two different families of curves, a second member mounted on and movable relatively to said first member, said second member having inscribed thereon markings adapted for cooperation with one of said families of curves, a third member mounted on and movable relatively to said first member, said third member having inscribed thereon markings adapted for cooperation with the other of said families of curves, said second and third members each having inscribed thereon one or more curves, and a fourth member mounted on and movable relatively to said first member as well as relatively to the second and third members, said fourth member having markings inscribed thereon for cooperation respectively with the curves inscribed on said second and third members whereby when all of the aforesaid members occupy a particular position the markings thereon indicate the relationship between several factors of a given problem.

4. In a calculator, a first member having inscribed thereon separate groups of face markings, a second member and a third member fastened to and independently movable in relation to said first member, each said second and third members having inscribed thereon edge markings and also face markings, the edge markings being adapted for cooperation respectively with the separate group markings inscribed on said first member, and a fourth member fastened to said first member and movable relatively to said second and third members as well as relatively to said first member, said fourth member having inscribed thereon markings adapted for cooperation with the face markings on said second and third members as well as with certain of the face markings on said first member whereby when all of the aforesaid members occupy a particular position the markings thereon indicate the relationship between several factors of a given problem.

5. In a calculator, a first member having inscribed thereon at least three separate groups of face markings, separate side by side members fastened to and independently movable relatively to said first member, each of the side by side members having inscribed thereon edge markings and face markings, the edge markings being adapted for cooperation respectively with two of the separate groups of face markings inscribed on the first member, and a fourth member fastened to said first member and adapted to extend spanwise across the side by side members, the fourth member being freely movable and having inscribed thereon at least three markings adapted for cooperation respectively with the face markings on said side by side members and with the third face marking on said first member whereby when all of the aforesaid members occupy a particular position the markings thereon indicate the relationship between several factors of a given problem.

6. In a calculator, a first member having inscribed thereon a plurality of scales, a second member carried by and rotatable in its relation to said first member, said second member having inscribed thereon a family of curves, and a third member carried by and rotatable in its relation to said first and second members, said third member having inscribed thereon markings adapted for cooperation with said family of curves and also indices adapted for cooperation respectively with said plurality of scales whereby when all of the aforesaid members occupy a particular position the markings thereon indicate the relationship between several factors of a given problem.

7. In a calculator, a first member having inscribed thereon two different families of curves and a scale, a second member movable relatively to said first member, said second member having inscribed thereon markings adapted for cooperation respectively with said two families of curves and also having inscribed thereon at least one curve, and a third member movable in relation to said first and second members, said third member having inscribed thereon segregate markings adapted for cooperation respectively with the scale on said first member and with the curve inscribed on said second member whereby when all of the aforesaid members occupy a particular position the markings thereon indicate the relationship between several factors of a given problem.

8. In a calculator, a first member having inscribed thereon two groups of face markings, a second member movable in relation to said first member, said second member having inscribed thereon an edge marking adapted for cooperation with one of the two groups of face markings inscribed on said first member and also having inscribed thereon a face marking, a third member movable in relation to said first member, said third member having inscribed thereon an edge marking adapted for cooperation with the other group of face markings inscribed on said first member and also having inscribed thereon a face marking, and a fourth member movable in relation to the other three members, said fourth member having inscribed thereon segregate edge markings adapted for cooperation respectively with the face markings on said second and third members whereby when all of the aforesaid members occupy a particular position the markings thereon indicate the relationship between several factors of a given problem.

9. In a calculator, a first member, a second member having inscribed thereon a face marking, a third member having inscribed thereon a face marking, each said second and third member being movable in relation to the first said member, and a fourth member adapted to overlie both the second and the third said members, said fourth member being movable in relation to said second and third members and having inscribed thereon segregate markings adapted for cooperation respectively with one each of said face markings whereby when all of the aforesaid members occupy a particular position the markings thereon indicate the relationship between several factors of a given problem.

10. In a calculator, a first member, a second member pivoted to said first member, said second member having inscribed thereon markings adapted for cooperation with markings on said first member, a third member pivoted to said first member, said third member having inscribed thereon markings adapted for cooperation with other and different markings inscribed on said first member and having its pivot axis spaced from the pivot axis of said second member, and a fourth member pivoted to the first said member, said fourth member having inscribed thereon markings adapted for cooperation respectively with other and further markings inscribed on the second and third members respectively, and having its pivot axis in coincidence with one of the two pivot axes aforesaid whereby when all of the aforesaid members occupy a particular position the markings thereon indicate the relationship between several factors of a given problem.

11. In a calculator, a first member having inscribed thereon two families of curves, a second member movable in relation to said first member and having inscribed thereon markings adapted for cooperation with one of said families of curves, a third member movable in relation to said first member and having inscribed thereon markings adapted for cooperation with the other of said families of curves, said second and third members each having inscribed thereon one or more curves, and a fourth member movable in relation to the other three members, said fourth member having inscribed thereon markings adapted for cooperation respectively with the one or more curves inscribed on the second and third members whereby when all of the aforesaid members occupy a particular position the markings thereon indicate the relationship between several factors of a given problem.

12. In a calculator, a first member having inscribed thereon a curve, a second member movable relatively to said first member, said second member having inscribed thereon markings adapted for cooperation with said curve and also having inscribed thereon a curve, a third member movable relatively to said first and second members, said third member having inscribed thereon a curve, and a fourth member movable in relation to the other said members and having inscribed thereon segregate markings adapted for cooperation respectively with the curves inscribed on the second and third members whereby when all of the aforesaid members occupy a particular position the markings thereon indicate the relationship between several factors of a given problem.

13. In a calculator, a first member provided with two groups of markings, a second member rotatable in relation to said first member, said second member having inscribed thereon a family of curves and also a marking adapted for cooperation with one of said groups of markings, a third member rotatable in relation to said first member, said third member having a marking adapted to cooperate with the other of said groups of markings said second and third members having a common axis of rotation and means rotatable with and adjustable in its relation to said third member, said means having inscribed thereon markings adapted for cooperation with said family of curves whereby when all of the aforesaid members occupy a particular position the markings thereon indicate the relationship between several factors of a given problem.

14. In a calculator, a first member, a second member pivoted to said first member, said second member having inscribed thereon a family of curves, a third member pivoted to said first member, said third member having inscribed thereon a curve, said second and third members having their pivot axes disposed in spaced relation, and a fourth member mounted on said first member and rotatable in relation to the second and third members, said fourth member having scales inscribed thereon adapted for cooperation respectively with the curves inscribed on the second and third members, the pivot axis of said fourth member being in coincidence with one of the pivoted axes aforesaid whereby when all of the aforesaid members occupy a particular position the markings thereon indicate the relationship between several factors of a given problem.

15. In a calculator, a first member having inscribed thereon a family of curves, a second member pivoted to said first member, said second member being provided with edge markings adapted for cooperation with said family of curves and having inscribed on its face a curve, and a third member pivoted to said first member, said third member having its pivot axis offset in relation to the pivot axis of said second member and having inscribed thereon edge markings adapted for cooperation with the curve inscribed on said second member whereby when all of the aforesaid members occupy a particular position the markings thereon indicate the relationship between several factors of a given problem.

16. In a calculator; a first member having inscribed thereon segregate markings representing two different factors; a second member fastened to and movable relatively to said first member, said second member having inscribed thereon segregate markings representing two different factors, one of which said markings is adapted to cooperate with one of the markings on said first member; a third member fastened to and movable relatively to said first member, said third member having inscribed thereon segregate markings representing two different factors, one of which is adapted to cooperate with the other of the markings on said first member; and a fourth member movable relatively to said second and third members as well as relatively to said first member, said fourth member having inscribed thereon segregate markings representing two different factors adapted to cooperate respectively with the markings on said second and third members whereby when all of the aforesaid members occupy a particular position the markings thereon indicate the relationship between several factors of a given problem.

17. In a calculator; a first member having inscribed thereon segregate markings representing three different factors; a second member fastened to and movable relatively to said first member, said second member having inscribed thereon segregate markings representing two different factors, one of which said markings is adapted to cooperate with one of the markings on said first member; a third member fastened to and movable relatively to said first member, said third member having inscribed thereon segregate markings representing two different factors, one of which is adapted to cooperate with one of the other markings on said first member; and a fourth member fastened to said first member and movable relatively to said second and third members as well as relatively to said first member, said fourth member having inscribed thereon segregate markings representing three different factors, one of which is adapted to cooperate with the third of the markings on said first member and the remaining two respectively with the other of the markings on said second member and on said third member whereby when all of the aforesaid members occupy a particular position the markings thereon indicate the relationship between several factors of a given problem.

18. In a calculator; a first member having inscribed on its face a family of curves representing one factor, a second member pivoted to said first member and provided with edge markings adapted for cooperation with said family of curves and having inscribed on its face a family of curves representing a different factor; and a third member pivoted to said first member, said third member and said second member having a common pivot axis and said third member being provided with an edge marking adapted for cooperation with the family of curves of said second member whereby when all of the aforesaid members occupy a particular position the markings thereon indicate the relationship between several factors of a given problem.

19. In a calculator; a first member having inscribed thereon a family of curves representing one factor and also markings representing a different factor; a second member pivoted to said first member, said second member having inscribed thereon segregate markings one of which is adapted for cooperation with said family of curves; and a third member pivoted to said first member, said third member having inscribed thereon segregate markings adapted to cooperate respectively with the other of the markings on said first member and on said second member whereby when all of the aforesaid members occupy a particular position the markings thereon indicate the relationship between several factors of a given problem.

20. In a calculator; a first member having inscribed thereon two families of curves; a second member mounted on and movable in relation to said first member, said second member having inscribed thereon segregate markings one of which is adapted to cooperate with one said family of curves; and a third member movable in relation to said first and said second members, said third member having inscribed thereon segregate markings adapted to cooperate respectively with the other said family of curves and with the other of the markings on said second member whereby when all of the aforesaid members occupy a particular position the markings thereon indicate the relationship between several factors of a given problem.

21. In a calculator; a first member; a second member rotatable in relation to said first member, said second member having inscribed thereon a face marking; a third member rotatable in relation to said first member, said third member having inscribed thereon a face marking; and a fourth member adapted to overlie said second and third members and rotatable in relation thereto, said fourth member having inscribed thereon segregate markings adapted to cooperate respectively with the face markings on said second and third members, the axis of rotation of said fourth member being in coincidence with the axis of rotation of one of the other of said rotatable members whereby when all of the aforesaid members occupy a particular position the markings thereon indicate the relationship between several factors of a given problem.

22. In a calculator; a first member having inscribed thereon segregate markings, one of which said markings comprises a family of curves; a second member mounted on and movable in relation to said first member, said second member having inscribed thereon segregate markings, one of which said markings is adapted to cooperate with one of the segregate markings on said first member; and a third member movable in relation to said first and said second members, said third member having inscribed thereon segregate markings adapted to cooperate respectively with the other of the markings on said first member and with the other of the markings on said second member whereby when all of the aforesaid members occupy a particular position the markings thereon indicate the relationship between several factors of a given problem.

23. In a calculator; a first member having inscribed thereon segregate markings; a second member mounted on and movable in relation to said first member, said second member having inscribed thereon a family of curves; and a third member movable in relation to said first and said second members, said third member having inscribed thereon segregate markings adapted to cooperate respectively with the segregate markings on said first member and with the family of curves on said second member whereby when all of the aforesaid members occupy a particular position the markings thereon indicate the relationship between several factors of a given problem.

ARTHUR L. THURSTON.
BEAUREGARD SWEENEY.